US012789905B2

(12) United States Patent
Pinagapani et al.

(10) Patent No.: US 12,789,905 B2
(45) Date of Patent: Nov. 10, 2026

(54) STEEL REINFORCEMENT SYSTEM FOR A SILL ROCKER PANEL

(71) Applicant: FCA US LLC, Auburn Hills, MI (US)

(72) Inventors: Sachithanandam Pinagapani, Troy, MI (US); Diane R Coopmans, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 408 days.

(21) Appl. No.: 18/498,130

(22) Filed: Oct. 31, 2023

(65) Prior Publication Data

US 2025/0136184 A1 May 1, 2025

(51) Int. Cl.
*B62D 25/02* (2006.01)

(52) U.S. Cl.
CPC .................................. *B62D 25/025* (2013.01)

(58) Field of Classification Search
CPC ............................ B62D 25/025; B62D 21/157
USPC .......................................................... 296/209
See application file for complete search history.

(56) References Cited

U.S. PATENT DOCUMENTS 6,073,992 A 6/2000 Yamauchi et al.
8,690,227 B2 4/2014 Matsuoka et al.
9,725,118 B2 8/2017 Alwan et al.
10,328,978 B2 6/2019 Yang et al.
2013/0049405 A1 2/2013 Kurogi et al.
2023/0147528 A1* 5/2023 Qin ...................... B62D 21/157 296/209
2023/0159107 A1* 5/2023 Matecki ................. B62D 21/15 296/209

FOREIGN PATENT DOCUMENTS

CN 107031729 A 8/2017
CN 112277584 A 1/2021
EP 1840003 A2 10/2007
EP 2230156 B1 1/2012
EP 3090923 A1 11/2016
WO WO-2024202578 A1 * 10/2024 ............... B60K 1/04

OTHER PUBLICATIONS

Ishikawa, PCT No. WO2024202578 A1. English translation dated 2026. (Year: 2023).*

* cited by examiner

*Primary Examiner* — Caroline N Butcher
(74) *Attorney, Agent, or Firm* — Jeremy J. Klobucar

(57) ABSTRACT

A vehicle sill reinforcement beam has a first elongated beam panel with a hat shape in cross section and a first and second flange. One flange is on each side of the hat shape. A second elongated beam panel, opposing the first beam panel, with a hat shape in cross section and a first and second flange. One flange is on each side of the hat shape. The opposing first and second flanges are secured to one another. A third elongated panel with a hat shape in cross section. The third panel is positioned between the first and second panels with its hat shape extending into the hat shape of the first panel. A fourth elongated panel has a hat shape in cross section. The fourth panel is positioned between the first and second panels with its hat shape extending into the hat shape of the second panel.

10 Claims, 3 Drawing Sheets

STEEL REINFORCEMENT SYSTEM FOR A SILL ROCKER PANEL

FIELD

The present disclosure relates to vehicles and, more particularly, to sill reinforcement systems.

BACKGROUND

This section provides background information related to the present disclosure which is not necessarily prior art.

In electric vehicles, the batteries are positioned underneath the vehicle cab or passenger area. Thus, the batteries are positioned between the driver and passenger sides of the vehicle. Accordingly, it is desirable to protect the batteries against side impact that may occur to the vehicle. Thus, it is desirable to have a sill or rocker panel reinforcement system.

Current sill reinforcement systems are ordinarily formed from aluminum material. The reinforcement systems are positioned inside of the sill inner panel and the sill outer panel. Thus, the reinforcement structure absorbs energy that may occur during an impact. While these designs appear to be satisfactory, designers are always striving to improve the art.

Accordingly, the present disclosure provides the art with a steel sill reinforcement system. The steel reinforcement system is installed inside the sill or rocker panel of the automotive vehicle to absorb energy during side or offset frontal impacts. The disclosure provides a reinforcement system that includes steel parts that are either stamped or roll formed and joined together by welding or other fastening options. The present disclosure provides a less expensive and easily weldable steel structure with marginal mass difference. The disclosure is independent of the body side outer sill. Also, the present disclosure provides a range of gauge and material grade possibilities that enable tuning and optimizing for different vehicles without changing the basic design configuration.

SUMMARY

This section provides a general summary of the disclosure, and is not a comprehensive disclosure of its full scope or all of its features.

According to a first aspect of the disclosure, a reinforcement for a vehicle sill comprises a first elongated panel with a hat shape cross section and a first and second flange. One flange is on each side of the hat shape. A second elongated panel opposes the first panel. It has a hat shape cross section with a first and second flange. One flange is on each side of the hat shape. The opposing first and second flanges are secured to one another. A third elongated panel has a hat shape cross section and is positioned between the first and second panels. The hat shape extends into the hat shape of the first panel. A fourth elongated panel has a hat shape cross section and is positioned between the first and second panels. The hat shape extends into the hat shape of the second panel. The first and second flanges are offset with respect to one another. The third and fourth panels have at least one flange on one side of the hat shape to secure with the first or second flanges of the first and second panels. The third and fourth panels secure to opposite flanges from one another. The third and fourth panels other side of the hat shape is unsecured with the other panels or flanges. The third and fourth panel flange is interrupted along the length of the panel.

According to a second aspect of the disclosure, a vehicle with a sill comprises an inner sill panel and an outer sill panel. A reinforcement is positioned between the inner sill and outer sill panels. The reinforcement includes a first elongated panel with a hat shape in cross section with a first and second flange. One flange is one on each side of the hat shape. A second elongated panel opposes the first panel. It has a hat shape cross section with a first and second flange. One flange is on each side of the hat shape. The opposing first and second flanges are secured to one another. A third elongated panel has a hat shape cross section and is positioned between the first and second panels. The hat shape extends into the hat shape of the first panel. A fourth elongated panel has a hat shape cross section and is positioned between the first and second panels. The hat shape extends into the hat shape of the second panel. The first and second flanges are offset with respect to one another. The third and fourth panels have at least one flange on one side of the hat shape to secure with the first or second flanges of the first and second panels. The third and fourth panels secure to opposite flanges from one another. The third and fourth panels other side of the hat shape is unsecured with the other panels or flanges. The third and fourth panel flange is interrupted along the length of the panel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
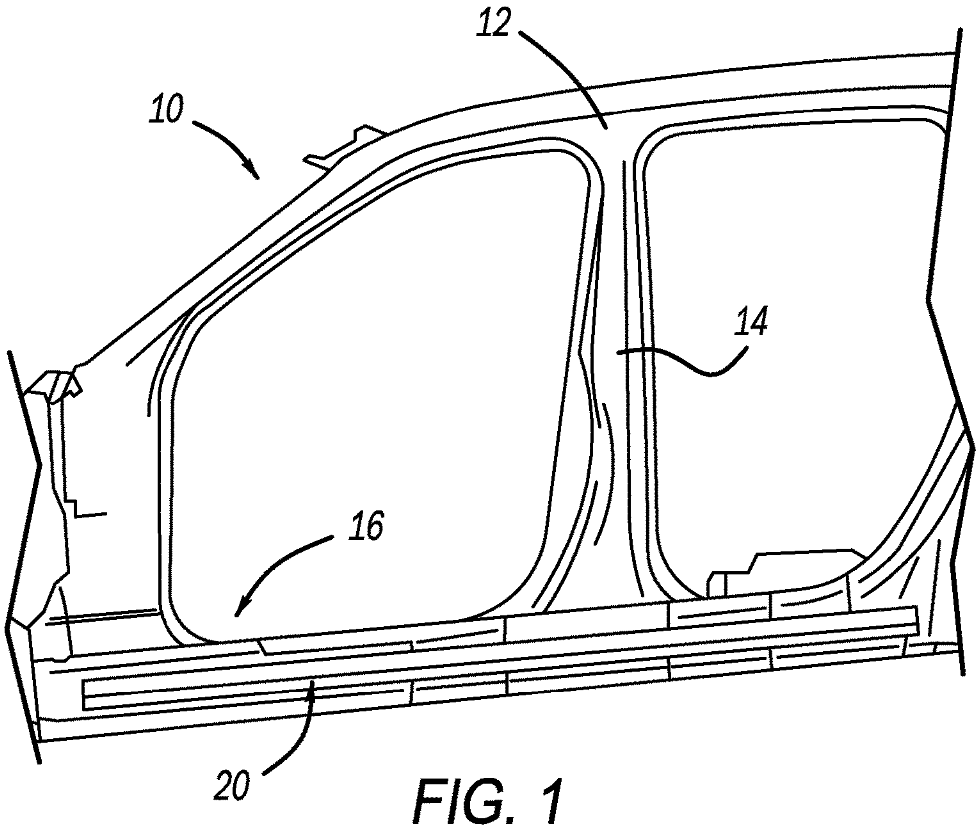
FIG. 1 is a schematic elevation view of a vehicle side body system.
Figure 2:
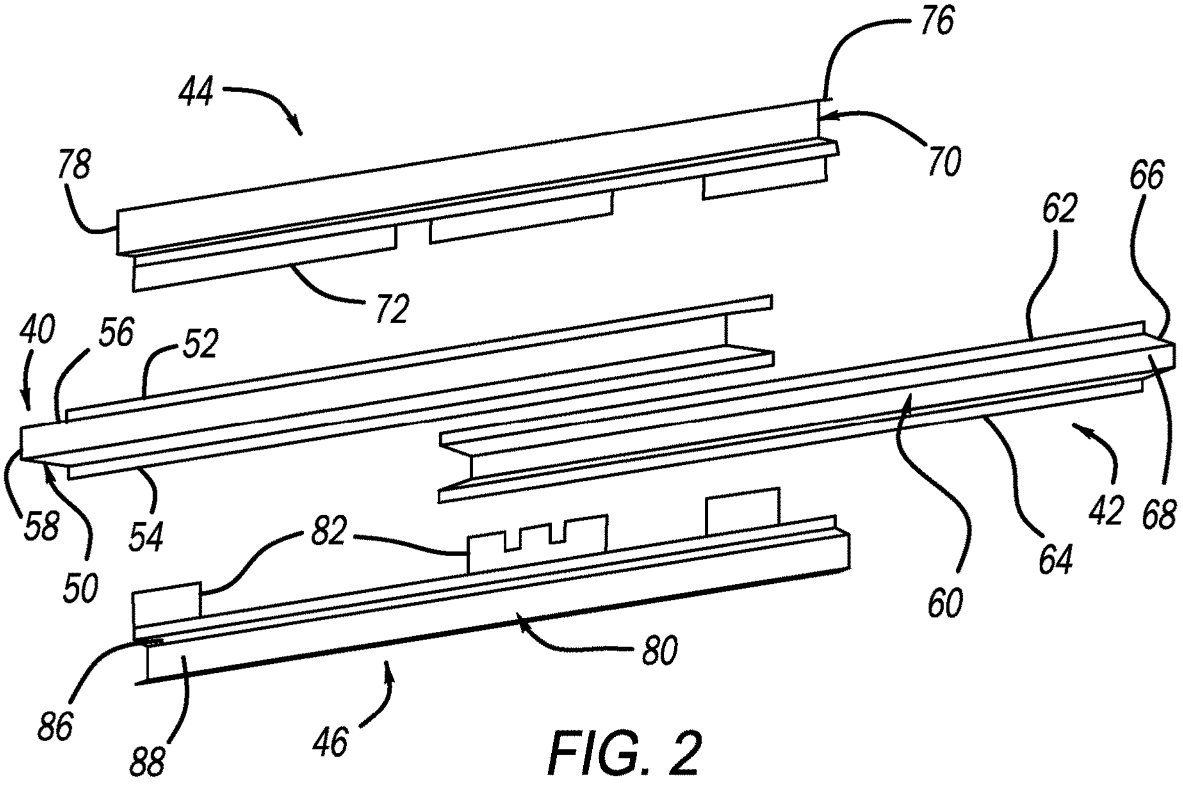
FIG. 2 is an exploded view of the reinforcement beam.
Figure 3:
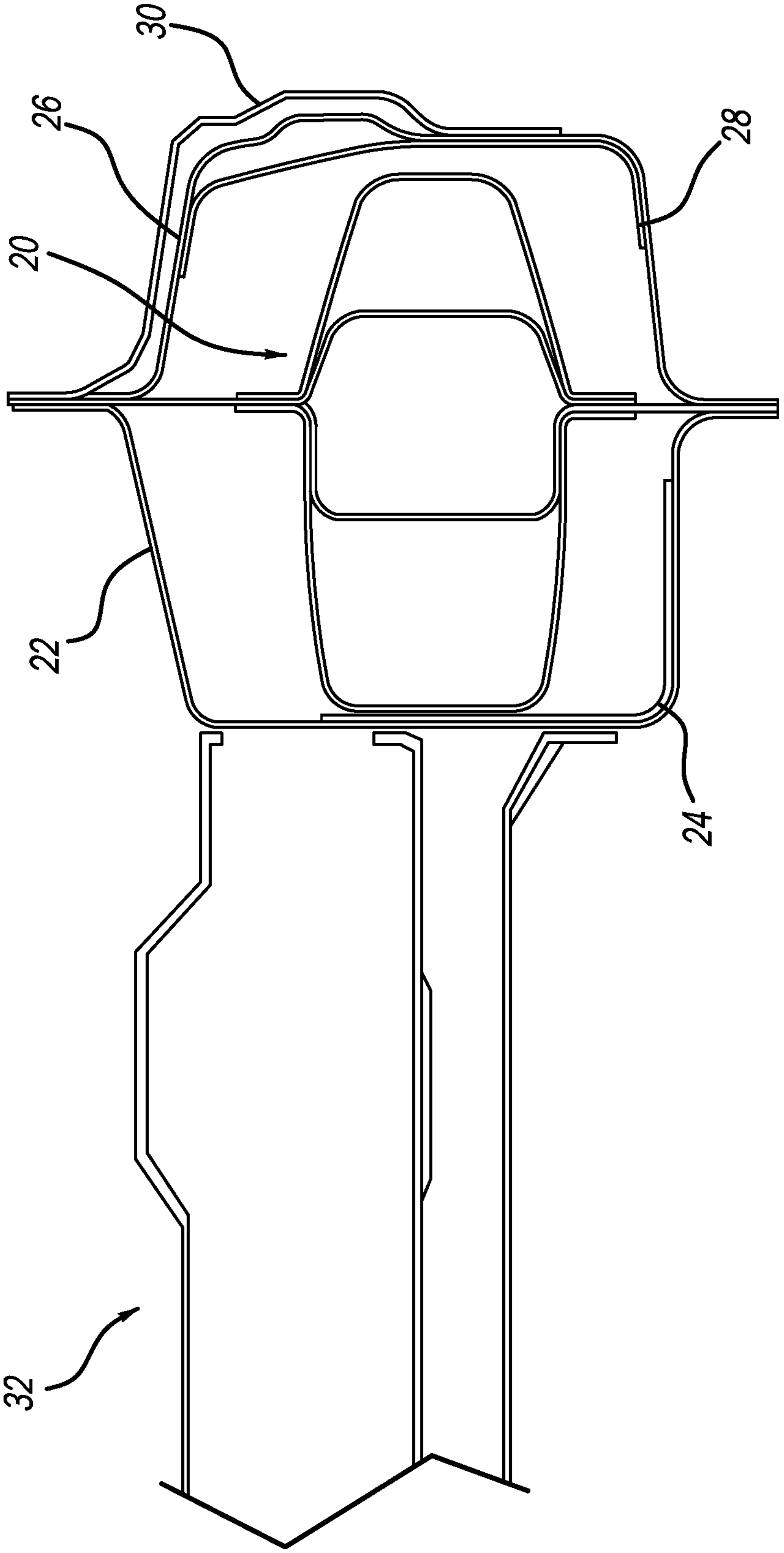
FIG. 3 is a cross-sectional view of the beam of FIG. 1.

Example embodiments will now be described more fully with reference to the accompanying drawings.

Turning to the figures, a vehicle side body system is illustrated and designated with the reference numeral 10. The side body system 10 includes a roof beam 12, a side beam 14 and a sill panel 16. A reinforcement beam 20 is positioned inside of the sill. The reinforcement beam 20 is positioned inside of the sill inner panel 22, sill inner reinforcement plate 24, sill outer reinforcement plate 26 and sill outer panel 28. The body side outer panel 30 is secured to the outer sill panel providing the sill or rocker panel of the vehicle. Also, the vehicle seat cross members 32 are positioned adjacent to the sill inner panel 22 and sill reinforcement plate 24.

The reinforcement beam 20 includes a first inboard side beam panel 40, a second outboard side beam panel 42, an inboard side middle beam panel 44 and an outboard side middle beam panel 46. All of the reinforcement panels 40, 42, 44 and 46 are elongated and extend the length of the sill or rocker panel as seen in FIG. 1.

The first reinforcement inboard side 40 includes an overall hat shape in cross-section with a hat portion 50 that includes a flange 52, 54 on each side of the hat portion 50. The flanges 52, 54 generally extend the length of the reinforcement beam panel 40. The flanges 52, 54 can be continuous or could include gaps along the flanges 52, 54. The hat portion 50 includes a pair of sides 56 and a web 58. Thus, the panel 40 provides a reinforcement member.

The second outboard side beam reinforcement panel 42 has an overall hat shape in cross section with a hat portion that includes a pair of flanges 62, 64 one each side of the hat portion 60. The hat portion 60 includes side surfaces 66 and a web 68 between the side surfaces 66.

The third reinforcement beam panel 44 has a hat shape in cross section with a hat portion 70 and a flange 72. The hat portion has sides 76 and a web 78 between the sides 76. The other side of the hat portion 70 is devoid of a flange. However, if desired, a flange could be present. The third reinforcement beam panel 44 has its hat portion 70 that projects or extends into the first reinforcement beam panel 40 hat shaped cross section.

The fourth reinforcement beam panel 46 includes a hat shape cross section with a hat portion 80. The hat portion 80 includes a flange 82. Also, the hat portion 80 has side surfaces 86 and a web 88. The flange 82 is on the opposing side of the reinforcement beam panel 46 when compared with the third reinforcement beam panel 44. Also, the opposing side of the fourth panel hat portion 80 is devoid of a flange. However, the side could have flange if desired. The fourth reinforcement beam panel 46 has its hat portion 80 that projects or extends into the second reinforcement beam panel hat shaped cross section.

By having the third and fourth reinforcement beam panels 44, 46 with their flange on opposite sides of one another, one flange adjoins and is welded with the first flanges 52, 62 while the other adjoins and is welded to the opposing second flanges 54, 64. Thus, the reinforcement member 20 includes four reinforcement beam panels, with hat shaped cross sections, that are welded to one another at the flanges.

The reinforcement beam panels 40-46 are manufactured from a steel material so that various gauges and grades of material may be utilized to optimize the reinforcement 20 for various vehicles. The reinforcement beam panels 40-46 are either stamped or rolled formed and joined together by welding or other fastening options. The middle reinforcement beam panels 44, 46 have a height and width that can be set to interface and secure with the sill or rocker flanges to connect the vehicle sill system beam 20 with the vehicle. Accordingly, as shown, the first reinforcement panel beam pane 40 is attached to the sill inner panel 22. The second reinforcement beam panel 42 is located close to the sill outer panel 29. The third reinforcement beam panel 44 is connected to the sill lower flanges while the fourth reinforcement beam panel 46 is connected to the sill's upper flanges. The offset of the upper and lower flanges of the first and second reinforcement beam panels 40, 42 are aligned to have an offset of less than 15% of the sill's lateral width. The sill reinforcement system beam 20 is independent of the body side outer panel.

Figure 4:
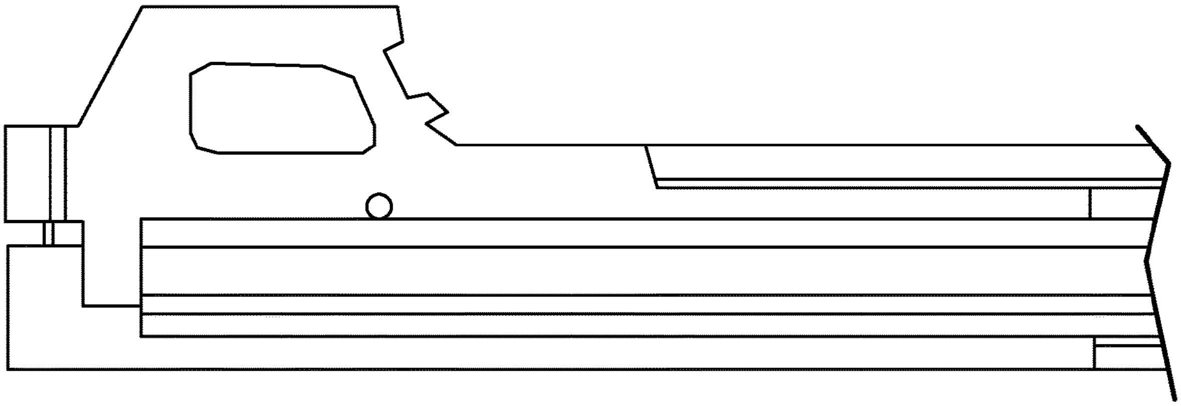
FIG. 4 is an elevation view of an additional embodiment of the beam.

FIG. 4 illustrates the reinforcement beam 20 with a shear plate 90 on the third beam panel 44 at the sill front end. The reinforcement or shear plate 90 is combined to provide and act as a shear plate at the front end of the sill to enhance energy absorption from offset frontal impacts.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reinforcement beam for a vehicle sill that includes a sill inner panel and sill outer panel that collectively define a cavity, the reinforcement beam being positioned in the cavity and comprising:

a first elongated beam panel having a first hat shape in cross section with a first flange on one side of the first hat shape and a second flange on an opposite side of the first hat shape;

a second elongated beam panel that is separate from the first elongated beam panel, opposed to the first beam panel, and having a second hat shape in cross section with a third flange on one side of the second hat shape and second fourth flange on an opposite side of the second hat shape, wherein the first and third flanges are opposed to one another and the second and fourth flanges are opposed to one another;

a third elongated beam panel having a third hat shape in cross section, the third elongated beam panel being separate from the first and second elongated beam panels, positioned between the first and second elongated beam panels with the third hat shape extending into the first hat shape of the first panel, and the third elongated beam panel having a fifth flange that is sandwiched between the second and fourth flanges and; and a fourth elongated beam panel having a fourth hat shape in cross section, the fourth elongated beam panel being separate from the first, second, and third elongated beam panels, positioned between the first and second elongated beam panels with the fourth hat shape extending into the second hat shape of the second elongated beam panel, and the fourth elongated beam panel having a sixth flange that is sandwiched between the first and third flanges.

2. The reinforcement beam for a vehicle of claim 1, wherein the first and third flanges are aligned with respect to one another.

3. The reinforcement beam for a vehicle of claim 1, wherein sides of the third and fourth hat shapes that do not include the fifth and sixth flanges, respectively, are unsecured with the other panels.

4. The reinforcement beam for a vehicle of claim 1, wherein the fifth and sixth flanges are interrupted along the length of the third and fourth elongated panels, respectively.

5. A vehicle comprising:

a sill including an inner sill panel and an outer sill panel that collectively define a cavity;

a reinforcement beam positioned between the inner and outer sill panels in the cavity, the reinforcement beam including:

a first elongated beam panel having a first hat shape in cross section with a first flange on one side of the first hat shape and a second flange on an opposite side of the first hat shape, one flange on each side of the hat shape;

a second elongated beam panel that is separate from the first elongated beam panel, opposed to the first beam panel, and having a second hat shape in cross section with a third flange on one side of the second hat shape and second fourth flange on an opposite side of the second hat shape, one flange on each side of the hat shape, wherein the opposing first and second third flanges secured are opposed to one another and the second and fourth flanges are opposed to one another;

a third elongated beam panel having a third hat shape in cross section, the third elongated beam panel being separate from the first and second elongated beam panels, positioned between the first and second elongated beam panels with the third hat shape extending into the first hat shape of the first panel, and the third elongated beam panel having a fifth flange that is sandwiched between the second and fourth flanges and; and a fourth elongated beam panel having a fourth hat shape in cross section, the fourth elongated beam panel being separate from the first, second, and third elongated beam panels, positioned between the first and second elongated beam panels with the fourth hat shape extending into the second hat shape of the second elongated beam panel, and the fourth elongated beam panel having a sixth flange that is sandwiched between the first and third flanges.

6. The vehicle of claim 5, wherein the first and third flanges are aligned with respect to one another.

7. The vehicle of claim 5, wherein sides of the third and fourth hat shapes that do not include the fifth and sixth flanges, respectively, are unsecured with the other panels.

8. The vehicle of claim 5, wherein the fifth and sixth flanges are interrupted along the length of the third and fourth elongated panels, respectively.

9. The vehicle of claim 5, wherein one of the fifth or sixth flanges is secured with the inner sill panel.

10. The vehicle with a sill or rocker panel of claim 9, wherein the other of the fifth or sixth flanges is secured with the outer sill panel.

* * * * *